United States Patent
Hay et al.

(10) Patent No.: US 10,190,405 B2
(45) Date of Patent: Jan. 29, 2019

(54) BOREHOLE ARRAY FOR RANGING AND CROSSWELL TELEMETRY

(71) Applicant: Halliburton Energy Services, Inc., Houston, TX (US)

(72) Inventors: Richard T. Hay, Spring, TX (US); Mac Upsahll, Calgary (CA)

(73) Assignee: Halliburton Energy Services, Inc., Houston, TX (US)

( * ) Notice: Subject to any disclaimer, the term of this patent is extended or adjusted under 35 U.S.C. 154(b) by 109 days.

(21) Appl. No.: 14/488,170

(22) Filed: Sep. 16, 2014

(65) Prior Publication Data

US 2015/0002306 A1   Jan. 1, 2015

Related U.S. Application Data

(63) Continuation of application No. 13/056,661, filed as application No. PCT/US2009/049470 on Jul. 2, 2009, now Pat. No. 8,912,915.

(51) Int. Cl.
 *E21B 47/04* (2012.01)
 *G01V 11/00* (2006.01)
 *E21B 47/09* (2012.01)

(52) U.S. Cl.
 CPC .............. *E21B 47/04* (2013.01); *E21B 47/09* (2013.01); *G01V 11/002* (2013.01)

(58) Field of Classification Search
 CPC ........................................................ E21B 47/00
 USPC ............................................ 340/853.1, 854.1
 See application file for complete search history.

(56) References Cited

U.S. PATENT DOCUMENTS

| | | | |
|---|---|---|---|
| 407,220 | A | 7/1889 | King |
| 2,183,565 | A | 12/1939 | Hawley |
| 3,350,634 | A | 10/1967 | Hoehn, Jr. |
| 3,406,766 | A | 10/1968 | Henderson |
| 3,731,752 | A | 5/1973 | Schad |

(Continued)

FOREIGN PATENT DOCUMENTS

| | | |
|---|---|---|
| WO | 2009/151867 | 12/2009 |
| WO | 2010/141004 | 12/2010 |

(Continued)

OTHER PUBLICATIONS

Halliburton Energy Services, Inc,"Sperry Drilling Services Active Magnetic Ranging System", www@halliburton.com, H05637, (Jun. 2008), 2 pgs.

(Continued)

*Primary Examiner* — Amine Benlagsir
(74) *Attorney, Agent, or Firm* — Benjamin Fite; Tumey L.L.P.

(57) ABSTRACT

An example method includes polling a plurality of reference nodes distributed along one or more reference wells. The method also includes steering a bottomhole assembly in another well based at least in part on information obtained from said polling. A related system includes a plurality of reference nodes distributed along one or more reference wells. The system also includes a bottomhole assembly in another well. The system also includes a surface controller. The surface controller polls the plurality of reference nodes to obtain position information regarding the bottomhole assembly and directs a steering module of the bottomhole assembly based on the obtained position information.

18 Claims, 4 Drawing Sheets

(56) References Cited

U.S. PATENT DOCUMENTS

| | | | |
|---|---|---|---|
| 3,745,446 A | | 7/1973 | Norris |
| 3,967,201 A | * | 6/1976 | Rorden .................... 340/854.5 |
| 4,323,848 A | | 4/1982 | Kuckes |
| 4,458,767 A | | 7/1984 | Hoehn, Jr. |
| 4,529,939 A | | 7/1985 | Kuckes |
| 4,590,593 A | | 5/1986 | Rodney |
| 4,593,770 A | | 6/1986 | Hoehn, Jr. |
| 4,675,488 A | | 6/1987 | Mucha et al. |
| 4,700,142 A | | 10/1987 | Kuckes |
| 4,791,373 A | | 12/1988 | Kuckes |
| 4,933,640 A | | 6/1990 | Kuckes |
| 4,980,642 A | | 12/1990 | Rodney |
| 5,074,365 A | | 12/1991 | Kuckes |
| 5,138,313 A | | 8/1992 | Barrington |
| 5,218,301 A | | 6/1993 | Kuckes |
| 5,305,212 A | | 4/1994 | Kuckes |
| 5,485,089 A | * | 1/1996 | Kuckes .................... G01V 3/26 |
| | | | 175/45 |
| 5,515,931 A | | 5/1996 | Kuckes |
| 5,541,517 A | | 7/1996 | Hartmann |
| 5,589,775 A | | 12/1996 | Kuckes |
| 5,657,826 A | | 8/1997 | Kuckes |
| 5,675,488 A | | 10/1997 | McElhinney |
| 5,725,059 A | | 3/1998 | Kuckes et al. |
| 5,886,303 A | | 3/1999 | Rodney |
| RE36,569 E | | 2/2000 | Kuckes |
| 6,075,462 A | | 6/2000 | Smith |
| 6,098,727 A | | 8/2000 | Ringgenberg et al. |
| 6,160,492 A | | 12/2000 | Herman |
| 6,257,334 B1 | | 7/2001 | Cyr |
| 6,439,324 B1 | | 8/2002 | Ringgenberg et al. |
| 6,466,020 B2 | | 10/2002 | Kuckes et al. |
| 6,630,890 B1 | * | 10/2003 | Endo et al. ............... 340/853.9 |
| 6,657,597 B2 | | 12/2003 | Rodney et al. |
| 6,736,222 B2 | | 5/2004 | Kuckes et al. |
| 6,750,783 B2 | | 6/2004 | Rodney |
| 6,791,469 B1 | | 9/2004 | Rao et al. |
| 6,827,158 B1 | * | 12/2004 | Dimitroff ................ E21B 7/002 |
| | | | 175/173 |
| 7,017,662 B2 | | 3/2006 | Schultz et al. |
| 7,030,617 B2 | | 4/2006 | Conti |
| 7,084,782 B2 | | 8/2006 | Davies et al. |
| 7,188,689 B2 | | 3/2007 | Maxwell et al. |
| 7,212,132 B2 | | 5/2007 | Gao et al. |
| 7,219,747 B2 | | 5/2007 | Gleitman et al. |
| 7,219,748 B2 | | 5/2007 | Gao et al. |
| 7,287,603 B2 | | 10/2007 | Hay et al. |
| 7,301,223 B2 | | 11/2007 | Rodney et al. |
| 7,336,199 B2 | | 2/2008 | Lasater et al. |
| 7,407,020 B2 | | 8/2008 | Gleitman et al. |
| 7,413,034 B2 | | 8/2008 | Kirkhope et al. |
| 7,505,242 B2 | | 3/2009 | Gullich |
| 7,650,269 B2 | | 1/2010 | Rodney |
| 7,668,583 B2 | | 2/2010 | Fegert et al. |
| 7,686,099 B2 | | 3/2010 | Rodney et al. |
| 7,743,654 B2 | | 6/2010 | Spross et al. |
| 7,757,781 B2 | | 7/2010 | Hay et al. |
| 7,812,610 B2 | | 10/2010 | Clark et al. |
| 8,170,851 B2 | | 5/2012 | Rodney |
| 9,010,461 B2 | | 4/2015 | Hay |
| 9,581,718 B2 | | 2/2017 | Rodney |
| 2002/0105332 A1 | | 8/2002 | Rosthal et al. |
| 2002/0113592 A1 | | 8/2002 | Omeragic |
| 2003/0085059 A1 | | 5/2003 | Kuckes et al. |
| 2003/0117134 A1 | | 6/2003 | Almaguer |
| 2003/0184303 A1 | | 10/2003 | Homan et al. |
| 2004/0004553 A1 | | 1/2004 | Rodney |
| 2004/0119476 A1 | | 6/2004 | Homan et al. |
| 2004/0249573 A1 | | 12/2004 | McElhinney |
| 2005/0168225 A1 | | 8/2005 | Haber et al. |
| 2005/0173119 A1 | | 8/2005 | Hay et al. |
| 2005/0288576 A1 | | 12/2005 | Fegert et al. |
| 2006/0036376 A1 | | 2/2006 | Gudmundsson et al. |
| 2006/0254820 A1 | * | 11/2006 | Cole ................. E21B 47/02224 |
| | | | 175/45 |
| 2007/0024464 A1 | * | 2/2007 | Lemenager .......... G01V 11/002 |
| | | | 340/853.1 |
| 2007/0126426 A1 | | 6/2007 | Clark et al. |
| 2007/0278008 A1 | * | 12/2007 | Kuckes ............. E21B 47/02216 |
| | | | 175/40 |
| 2008/0018334 A1 | | 1/2008 | Reiderman |
| 2008/0041626 A1 | | 2/2008 | Clark |
| 2008/0316048 A1 | * | 12/2008 | Abdallah ............. G01V 11/002 |
| | | | 340/854.6 |
| 2009/0030615 A1 | | 1/2009 | Clark |
| 2009/0164127 A1 | | 6/2009 | Clark |
| 2010/0108383 A1 | | 5/2010 | Hay et al. |
| 2010/0219646 A1 | | 9/2010 | Hay et al. |
| 2010/0305864 A1 | * | 12/2010 | Gies ........................ E21B 47/01 |
| | | | 702/9 |
| 2011/0153217 A1 | | 6/2011 | Rodney |
| 2011/0175899 A1 | | 7/2011 | Bittar et al. |
| 2012/0126993 A1 | | 5/2012 | Samson et al. |
| 2012/0158305 A1 | | 6/2012 | Rodney et al. |
| 2012/0162631 A1 | | 6/2012 | Hutchin |
| 2014/0035586 A1 | | 2/2014 | Rodney |

FOREIGN PATENT DOCUMENTS

| | | |
|---|---|---|
| WO | 2011/002461 | 1/2011 |
| WO | 2011/019340 | 2/2011 |

OTHER PUBLICATIONS

GE Energy, "Magrange III—Your Shortcut to Blowout Well Control", GE Energy—Oil & Gas Solutions, gepower.com/oilexploration, Twinburg, OH, (Oct. 2004),4 pgs.

PCT International Search Report and Written Opinion, dated Jul. 20, 2009, Appl No. PCT/US2009/045773, "Guide Wire for Ranging and Sub-Surface Broadcast Telemetry", filed Jun. 1, 2009, 7 pgs.

PCT International Search Report and Written Opinion, dated Sep. 9, 2009, Appl No. PCT/US09/49470, "Borehole Array for Ranging and Crosswell Telemetry", filed Jul. 2, 2009.

Gladiator Technologies, "New Low Noise Verion of G507 MEMS Gyro", http://www.gladiatortechnologies.com/NEWS/pressRoom_New . . . , G5OZ "LN Series" (Low Noise) Enables Demanding Stabilization Applications a Low Cost, Light Weight and VSG Compatible Alternative, (Sep. 21, 2009).

Wikipedia, "Lock-in amplifier", Wikipedia, http://en.wikipedia.org/wiki/Lock-in_amplifier, (Mar. 25, 2011), 6 pgs.

Williamson, Hugh S., "Accuracy Prediction for Directional MWD", SPE 56702, presented at the 1999 SPE Annual Technical Conference and Exhibition held in Houston, TX Oct. 3-6, 1999, 16 pgs.

PCT International Preliminary Report on Patentability, dated Dec. 15, 2011, Appl No. PCT/US2009/045773, "Guide Wire for Ranging and Sub-Surface Broadcast Telemetry", filed Jun. 1, 2009, 7 pgs.

PCT International Preliminary Report on Patentability, dated Jan. 12, 2012, Appl No. PCT/US09/49470, "Borehole Array for Ranging and Crosswell Telemetry", filed Jul. 2, 2009, 7 pgs.

US Non-Final Office Action, dated Jan. 2, 2013, U.S. Appl. No. 13/056,661, "Borehole Array for Ranging and Crosswell Telemetry", filed Jan. 30, 2011, 12 pgs.

US Final Office Action, dated Jun. 14, 2013, U.S. Appl. No. 13/056,661, "Borehole Array for Ranging and Crosswell Telemetry", filed Jul. 2, 2009, 16 pgs.

US Non-Final Office Action, dated Jul. 18, 2013, U.S. Appl. No. 13/055,852, "Guide Wire for Ranging and Subsurface Broadcast Telemetry", filed Jun. 1, 2009, 10 pgs.

PCT International Preliminary Report on Patentability, dated Oct. 10, 2013, Appl. No. PCT/US2011/030639, "Systems and Methods for Ranging While Drilling", filed May 31, 2011, 7 pgs.

US Final Office Action, dated Jan. 23, 2014, U.S. Appl. No. 13/055,852, "Guide Wire for ranging and subsurface broadcast telemetry," filed Jan. 25, 2011, 10 pgs.

US Non-Final Office Action, dated Jun. 13, 2014, U.S. Appl. No. 13/055,852, "Guide Wire for ranging and subsurface broadcast telemetry," filed Jan. 25, 2011, 10 pgs.

(56) References Cited

OTHER PUBLICATIONS

US Non-Final Office Action, dated Aug. 14, 2014, U.S. Appl. No. 13/577,329, "Systems and Methods for Ranging While Drilling," filed Aug. 6, 2012, 16 pgs.
US Final Office Action, dated Dec. 4, 2014, U.S. Appl. No. 13/577,329, "Systems and Methods for Ranging While Drilling," filed Aug. 6, 2012, 16 pgs.
US Non Final Office Action, dated Mar. 25, 2015, U.S. Appl. No. 13/577,329, "Systems and Methods for Ranging While Drilling," filed Aug. 6, 2012, 18 pgs.
"EP Extended Search Report", dated Oct. 8, 2015, "Systems and Methods for Ranging While Drilling" Appl. No. 11859018.1, filed Mar. 31, 2011, 6 pgs.
EP Office Action, dated Aug. 29, 2016, Appl No. 11859018.1, "Systems and Methods for Ranging While Drilling," Filed Mar. 31, 2011, 5 pgs.

* cited by examiner

BOREHOLE ARRAY FOR RANGING AND CROSSWELL TELEMETRY

CROSS-REFERENCE TO RELATED APPLICATIONS

The present application is a continuation of U.S. patent application Ser. No. 13/056,661, filed on Jan. 30, 2011, which in turn claims priority to PCT Pat. App. No. PCT/US2009/049470, filed on Jul. 2, 2009. The foregoing applications are hereby incorporated herein in their entirety.

BACKGROUND

The world depends on hydrocarbons to solve many of its energy needs. Consequently, oil field operators strive to produce and sell hydrocarbons as efficiently as possible. Much of the easily obtainable oil has already been produced, so new techniques are being developed to extract less accessible hydrocarbons. One such technique is steam-assisted gravity drainage ("SAGD") as described in U.S. Pat. No. 6,257,334, "Steam-Assisted Gravity Drainage Heavy Oil Recovery Process". SAGD uses a pair of vertically-spaced, horizontal wells less than about 10 meters apart.

In operation, the upper well is used to inject steam into the formation. The steam heats the heavy oil, thereby increasing its mobility. The warm oil (and condensed steam) drains into the lower well and flows to the surface. A throttling technique is used to keep the lower well fully immersed in liquid, thereby "trapping" the steam in the formation. If the liquid level falls too low, the steam flows directly from the upper well to the lower well, reducing the heating efficiency and inhibiting production of the heavy oil. Such a direct flow (termed a "short circuit") greatly reduces the pressure gradient that drives fluid into the lower well.

Short circuit vulnerability can be reduced by carefully maintaining the inter-well spacing, i.e., by making the wells as parallel as possible. (Points where the inter-well spacing is smaller than average provide lower resistance to short circuit flows.) in the absence of precision drilling techniques, drillers are forced to employ larger inter-well spacings than would otherwise be desirable, so as to reduce the effects of inter-well spacing variations. Precision placement of neighboring wells is also important in other applications, such as collision avoidance, infill drilling, observation well placement, coal bed methane degasification, and wellbore intersections for well control.

BRIEF DESCRIPTION OF THE DRAWINGS

A better understanding of the various disclosed embodiments can be obtained when the detailed description is considered in conjunction with the drawings, in which.

Figure 1:
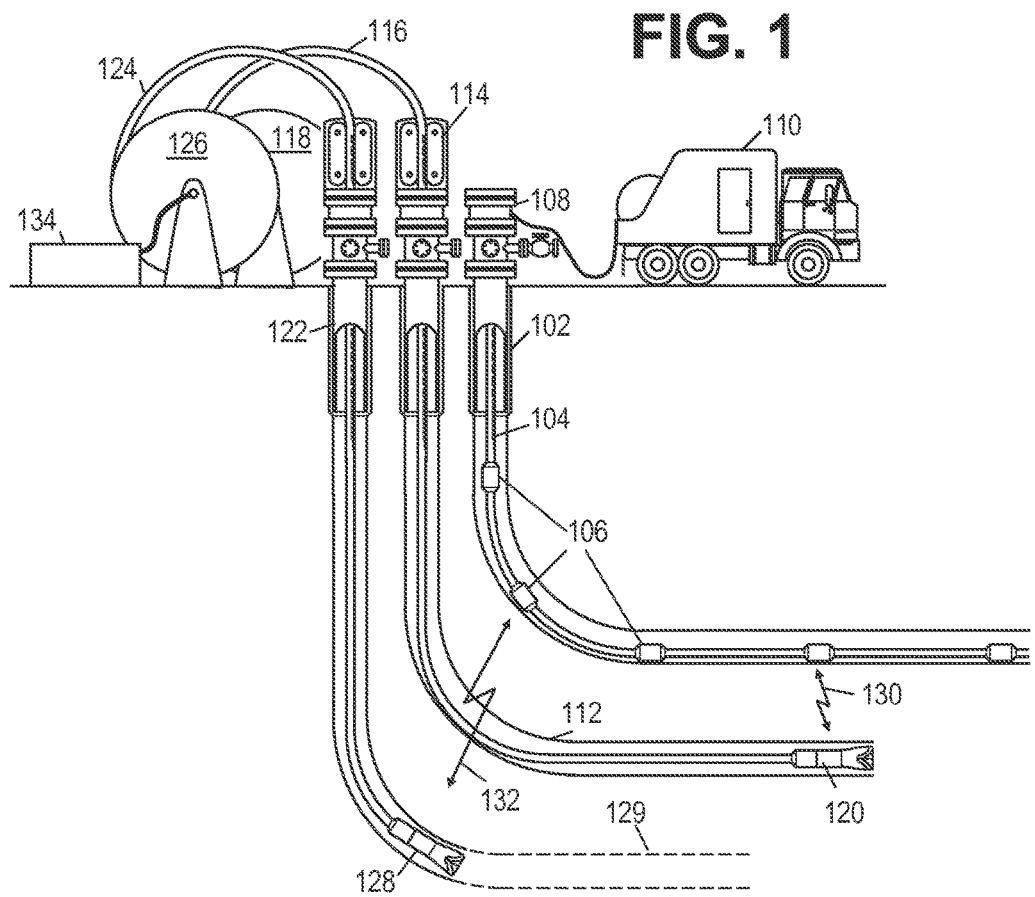
FIG. 1 shows an illustrative borehole array being used to concurrently guide multiple bottomhole assemblies.

While the invention is susceptible to various modifications and alternative forms, specific embodiments thereof are shown by way of example in the drawings and will herein be described in detail. It should be understood, however, that the drawings and detailed description thereto are not intended to limit the disclosed embodiments, but on the contrary, the intention is to cover all modifications, equivalents and alternatives falling within the scope of the appended claims.

DETAILED DESCRIPTION

The problems identified in the background are at least partly addressed by a borehole array for ranging and crosswell telemetry, along with certain methods for employing such a borehole array. Some embodiments of the borehole array include a set of electrically coupled reference nodes to be distributed along the length of a reference well. Each reference node includes a solenoid that is operated by a control unit. The control unit employs the solenoid to generate a magnetic field for guiding a bottomhole assembly in a nearby well. The control unit can further serve as a communications intermediary between the bottomhole assembly and a surface facility. With an array of such reference nodes, the bottomhole assembly can be guided in turn by subsequent reference nodes and employ the closest reference node as a communications link to the surface. Moreover, the use of multiple reference nodes offers greater precision in determining the bottomhole assembly's position relative to the reference well. The borehole array can potentially be used to guide multiple drilling operations at the same time.

Some embodiments of the drilling methods disclosed herein include: providing at least one reference well having an array of two or more reference nodes; electromagnetically communicating information between at least one of the reference nodes and a bottomhole assembly in a second well; determining a distance or direction between the bottomhole assembly and the reference node(s); and steering the bottomhole assembly based at least in part on said distance or direction. These operations can be used to guide the bottomhole assembly along a path parallel to the reference well. In some embodiments, only one of the reference nodes at a time is selected for communication with the bottomhole assembly. Where multiple wells are being drilled simultaneously, different reference nodes can be used to communicate with different bottomhole assemblies, although it is expected that any given reference node can also support concurrent communications with multiple bottomhole assemblies.

Other embodiments of the drilling methods disclosed herein include: providing multiple reference wells, each having at least one reference node; drilling a target well with a bottomhole assembly; determining distances or directions between the bottomhole assembly and the reference nodes; and steering the bottomhole assembly based at least in part on said distances or directions. Again, these operations can be used to direct the bottomhole assembly along a path parallel to at least one of the reference wells. The magnetic fields produced by the different reference nodes can be made distinguishable using multiplexing techniques, e.g., frequency multiplexing, time multiplexing, and code division multiplexing. To determine distance and direction, the bottomhole assembly can determine a gradient of each magnetic field, or employ one of the other distance and direction sensing techniques invented by Arthur F. Kuckes and disclosed in his various issued patents. Alternatively, the distance and direction determinations can be performed by the reference nodes, e.g., making multi-component measurements of a rotating magnetic field generated by the bottomhole assembly as taught in U.S. Pat. No. 5,589,775"Rotating Magnet for Distance and Direction Measurements From a First Borehole to a Second Borehole".

Turning now to the figures, FIG. 1 shows a reference well 102 having an illustrative borehole array 104 including multiple reference nodes 106 coupled together via lengths of slim tubing. (The inter-node couplings can take various alternative forms, including wireline cable or wired pipe, either of which could be included inside a larger diameter string of coiled or composite tubing for easy installation in the reference well.) A well head 108 anchors the borehole array, and a cable connects the borehole array to a surface facility such as a logging truck 110. FIG. 1 also shows a second well 112 in the process of being drilled. An injector 114 pulls a coil tubing string 116 from a spool 118 and drives it into a well. A bottomhole assembly 120 on the end of the string 116 includes a mud motor and a drill bit. As drilling fluid is pumped through the string, out through orifices in the drill bit, and back up the annulus around the string, the fluid flow drives a mud motor which turns the drill bit. The fluid flow can also drive a generator to power downhole electronics such as: a telemetry module, one or more sensor modules, and a steering module (discussed further below).

Also shown in FIG. 1 is a third well 122 in the process of being drilled with a coil tubing string 124 drawn from a spool 126 and injected into the well bore. A bottomhole assembly 128 on the end of the string 124 includes various tool modules, a mud motor and a drill bit. The mud motor is driven by the drilling fluid flow, and in turn it drives the drill bit to extend the well bore along a desired path 129. Desired path 129 is shown as running parallel to the horizontal portions of wells 102 and 112 because in many cases, such as steam-assisted gravity drainage (SAGD) or coal bed degasification, it is desirable to drill a series of closely-spaced parallel wells. Moreover, it could be desirable to be drilling multiple such wells at the same time.

Each of the bottomhole assemblies 120, 128 is equipped with a steering module that enables the well to be extended in a desired direction. Many suitable steering mechanisms are well known, e.g., steering vanes, "bent sub" assemblies, and rotary steerable systems. The steering mechanism configuration can be set and adjusted by commands from the surface, e.g., from logging truck 110 or from a driller's control panel 134. Alternatively, a downhole controller can be programmed with a desired route, and it can adjust the steering mechanism as needed to direct the well along the desired path.

Each of the bottomhole assemblies can be further equipped with a sensor module to determine the position of the bottomhole assembly relative to a desired path. The sensor module includes position sensing mechanisms such as gyroscopes, multi-component accelerometers, and/or magnetometers to detect inertial displacement and orientations relative to gravity and the earth's magnetic field. Moreover, the magnetometers are multi-component magnetometers for detecting the magnetic fields emitted by the reference nodes in the borehole array, enabling the bottomhole assemblies to determine their position relative to the reference nodes, e.g., in accordance with one of the methods taught by Arthur Kuckes in U.S. Pat. Nos. 5,305,212; RE36,569; 5,823,170; and 5,589,775. In some alternative embodiments, the bottomhole assemblies emit magnetic fields that can be sensed by the reference nodes to determine the relative position of the bottomhole assembly.

The bottomhole assemblies each further include a telemetry module that enables the bottomhole assembly to exchange electromagnetic inter-well communications with one or more of the reference nodes. Thus in FIG. 1, an arrow 130 indicates electromagnetic communications between a reference node and bottomhole assembly 120, while a second arrow 132 indicates electromagnetic communications between another reference node and bottomhole assembly 128. Since the reference nodes 106 are coupled to the surface via a wireline or wired pipe, the bottomhole assemblies 120, 128 are expected to achieve a high communications bandwidth to the surface by employing the reference nodes as communications intermediaries. Nevertheless, the telemetry module may also support conventional telemetry via the drill string as a backup communications technique, e.g., mud pulse telemetry, through-wall acoustic communications, or wired drill pipe telemetry. Low frequency electromagnetic signaling directly to the surface is another potential backup communications technique.

Figure 2:
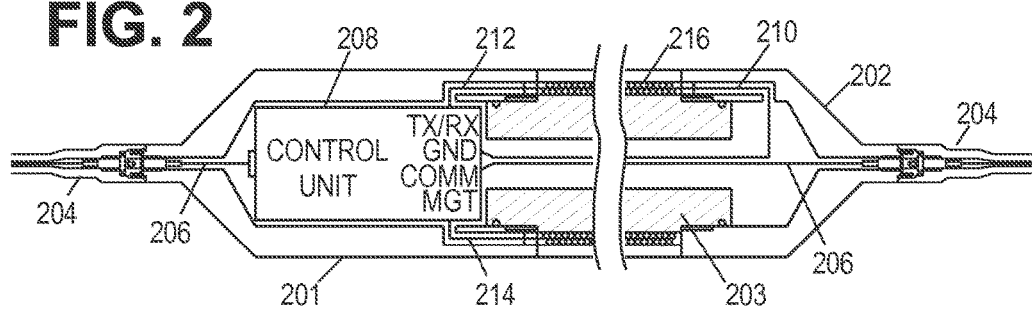
FIG. 2 shows an illustrative borehole array reference node.

FIG. 2 shows an illustrative reference node from a borehole array. The illustrated node includes two end caps 201, 202 threaded on a mandrel 203. Cable connectors 204 couple conductive communications lines 206 to the reference node. A control unit 208 inside the reference node communicates with the surface and optionally with other reference nodes via the communications lines. The control unit 208 drives a winding 216 on the mandrel 203 with a Magnetic Guidance Tool (MGT) signal wire 214 and a ground wire 210. The control unit 208 is further configured to use winding 216 (via a TX/RX wire 212 and ground wire 210) as a transmit/receive antenna for electromagnetic communications with a bottomhole assembly. Winding 216 may have one or more tap points on it to enable the transmit signal strength to be adjusted in accordance with the expected range to the target wellbore. (Such adjustability can be used to avoid saturating nearby receivers or to provide enough signal strength to reach more distant receivers.) The operation of control unit 208 is configured by the surface facility, e.g., whether the MGT signal is enabled and at what frequency it should be reversed, and what communications channel(s) should be used for communications with bottomhole assemblies.

Figure 3:
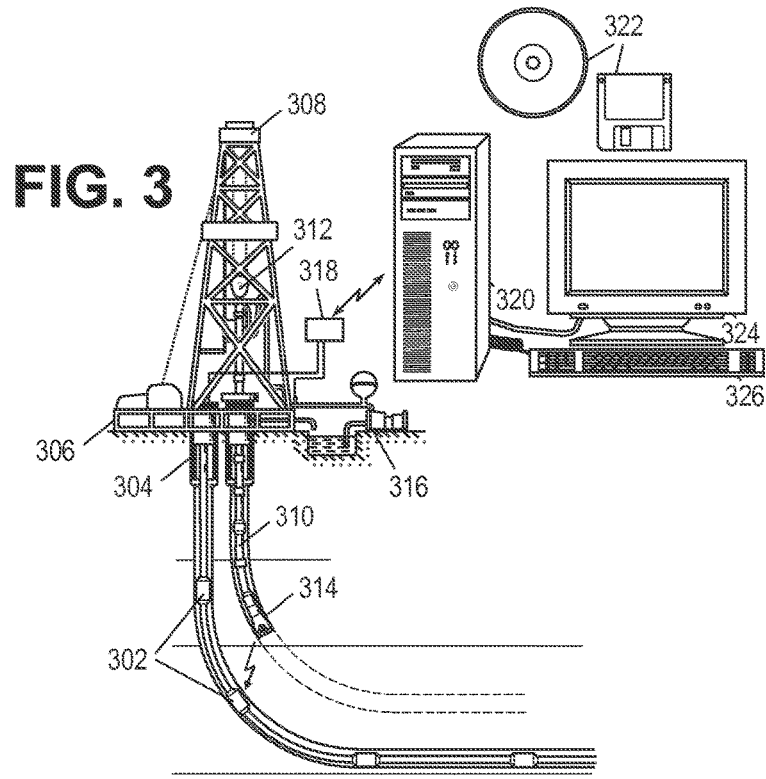
FIG. 3 shows an illustrative environment in which a borehole array is employed as part of a communication loop.

FIG. 3 shows another illustrative drilling environment having a borehole array of reference nodes 302 positioned in a reference well 304. A platform 306 supports a drilling rig 308 having a drill string 310 suspended from a top drive and a traveling block 312. A bottomhole assembly 314 at the end of the drill string 310 includes a drill bit to extend the well bore as the drill string is rotated and lowered. As previously described, the bottomhole assembly includes a telemetry module, one or more sensor modules, and a steering module.

During the drilling process, a "mud pump" 316 circulates drilling fluid down through the interior of drill string 310, out through orifices in the drill bit, and upward through the annulus around the drill string. The drilling fluid transports drill cuttings to the surface and stabilizes the borehole walls.

A data acquisition/communications hub 318 is connected to the wireline for the borehole array in reference well 304 to exchange messages with the reference nodes 302. Hub 318 is further connected to transducers for sending and receiving messages to the bottomhole assembly 314 via drill string 310. Communication via the drill string 310 can be accomplished using mud pulse telemetry, acoustic telemetry, electromagnetic (EM) telemetry, wired drill pipe telemetry or other conventional Logging While Drilling telemetry techniques. A wired or wireless link couples the hub 318 to a surface control system, represented by computer 320, to enable the surface control system to communicate with the bottomhole assembly 314 and the reference nodes 302.

Computer 320 executes software (represented in FIG. 3 by information storage media 322) to interact with a user via a display 324 and a user input device 326. The software enables a user to view the data being gathered by the bottomhole assembly 314 and to responsively steer the drill bit in a desired direction. In some embodiments, the steering can be automated by the software.

Unlike the embodiment of FIG. 1 in which the borehole array served as a bidirectional communications path to the bottomhole assemblies, the embodiment of FIG. 3 employs the borehole array as a portion of a unidirectional communication loop, e.g., a loop in which commands are communicated from the hub 318 to the bottomhole assembly 314 via the drill string 310, and in which data is communicated from the bottomhole assembly to the hub via a reference node in the borehole array. It is alternatively contemplated that downgoing communications would travel from the hub via the borehole array to the bottomhole assembly and that upgoing communications would travel via the drill string 310. In either embodiment, the reference nodes enable the driller to determine the position of the bottomhole assembly relative to the reference well.

Figure 4:
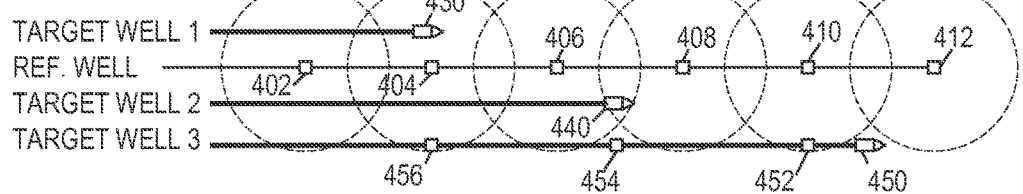
FIG. 4 illustrates the use of sequential nodes in a borehole array to guide multiple bottomhole assemblies.

FIG. 4 shows an illustrative series of reference nodes 402-412 in a borehole array in a reference well. As a bottomhole assembly 430 creates a nearby target well parallel to the reference well, the bottomhole assembly progresses from the coverage zone of one reference node 402 to the next reference node 404 and thence to the next. In this manner the borehole array can provide guidance for drilling the whole length of the target well without requiring any re-positioning of the reference nodes. Moreover, the borehole array can provide concurrent guidance (and a high-bandwidth telemetry path) for multiple bottomhole assemblies.

The reference nodes in FIG. 4 have overlapping zones of coverage so that in some positions (e.g., the position of bottomhole assembly 440) multiple reference nodes can be used to determine the relative position of the bottomhole assembly with increased precision. In embodiments where the reference nodes generate magnetic fields to guide the bottomhole assembly, adjacent reference node employ a strategy to make their magnetic fields distinguishable by the bottomhole assembly. Conversely, in embodiments where the bottomhole assemblies generate magnetic fields for the reference nodes to measure, the bottomhole assemblies can employ a similar strategy to enable the reference nodes to tell them apart. Suitable strategies include, without limitation, providing each node with a unique channel in a time division multiplexing (TDM), frequency division multiplexing (FDM), or code division multiplexing (CDM) scheme. In some cases channels can be re-used when there is no danger of overlap between nodes having a common channel. Other potentially suitable signaling protocols employ packet-based signaling with automatic collision detection and re-transmission from nodes having unique addresses.

When a bottomhole assembly 450 drills near the edge of the coverage area, there may be regions where the bottomhole assembly is outside the effective navigation region, requiring the use of inertial or other guidance techniques to steer the bottomhole assembly to the coverage zone of the next reference node. In such circumstances it may be advantageous to provide additional communication nodes 452, 454, 456 in the drill string to ensure at least one reference node can be reached for communication purposes even when the bottomhole assembly is out of range.

Figure 5:
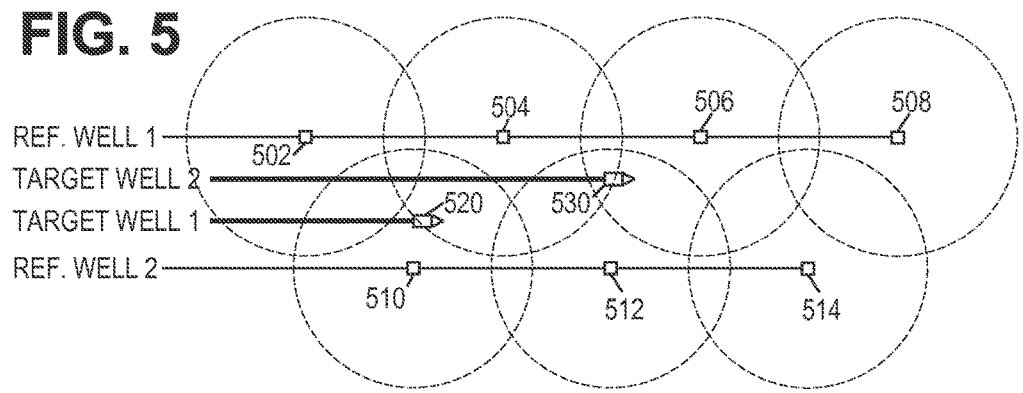
FIG. 5 illustrates the use of multiple borehole arrays to guide multiple bottomhole assemblies.

FIG. 5 shows an illustrative series of reference nodes 502-508 in a first reference well and a second series of reference nodes 510-514 in a second reference well. The two reference wells provide overlapping coverage zones, enabling the bottomhole assemblies 520, 530 to navigate off of multiple reference nodes in different wells. The overlapping coverage zones enable greater position determination accuracy.

Figure 6:
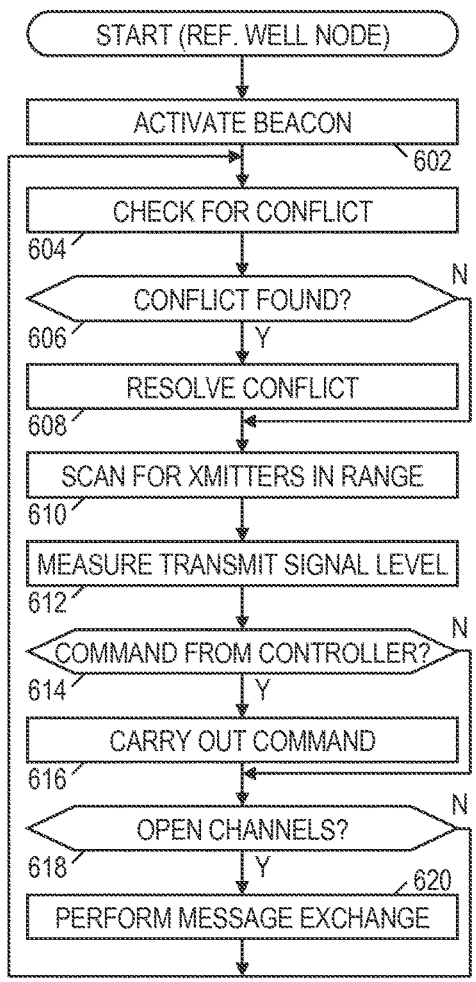
FIG. 6 shows an illustrative communication and guidance method that can be implemented by a reference node.

FIG. 6 shows an illustrative communication and guidance method that can be implemented by a reference node. A beacon is used to implement the guidance aspect of this illustrative method, When power is supplied to the reference node, the node activates the beacon in block 602. The beacon drives a solenoid to produce a magnetic field that can be detected by a bottomhole assembly. The beacon signal is programmed to vary in a manner that enables the receiver to determine the distance and direction to the transmitter. Because the signal pattern is known to the receiver, the receiver can use the variations to compensate for the effects of the earth's magnetic field. As one specific example, the beacon can be programmed to maintain a constant signal magnitude while periodically reversing the signal polarity. The rate at which the magnetic field is reversed can be adjusted by a command from the surface.

In block 604, the reference node checks for a conflict. A conflict exists if two transmitters with overlapping coverage regions are transmitting on the same channel. To determine whether such a conflict exists, the reference node may report its assigned channel to the surface facility (e.g., to logging truck 110) with a query as to whether that channel is being used by any other nodes. The surface facility can then approve the channel or suggest an alternative channel. Alternatively, the reference node can periodically "go quiet" and listen for other reference nodes to detect which channel they are using. The conflict check can be skipped unless the reference node determines too much time has passed since the last conflict check.

If, in block 606, a conflict is determined to exist, the reference node acts to resolve the conflict in block 608. For the present illustrative embodiment, such a resolution is achieved by adjusting the beacon frequency. Once a conflict has been resolved or determined not to exist, the reference node listens in block 610 for any detectable transmissions from one or more bottomhole assemblies. The signal levels of any such transmission are measured in block 612 and stored for possible retrieval by the surface facility. The content of any such transmission is also monitored for a request to open a bidirectional communications channel with the bottomhole assembly. Upon detecting such a request, the reference node engages in a handshaking operation to determine the protocol and sets up transmit and receive queues.

In block 614, the reference node checks for a command from the surface facility. Commands that can be received from the surface facility are expected to include: a command to read signal levels of any detected bottomhole assembly transmission; commands to transmit a message over an open channel; and commands to change the configuration of the reference node, including enabling or disabling the beacon.

In block 616, the reference node carries out any such received commands. For example, the reference node can transmit the measured signal levels of the detected transmissions. If the surface facility provides a message to be sent to a bottomhole assembly with which the reference node has an open channel, the message is placed in the transmit queue.

In block 618, the reference node checks for open communications channels. If any are open, the reference node checks the corresponding message queues in block 620. Any messages in the transmit queue are sent to the bottomhole assembly and any messages in the receive queue are sent to the surface facility. Such message exchanges can be initiated by the reference node control process and left to be carried out by parallel threads or independent hardware in the reference node. The control process loops back to block 604.

Figure 7:
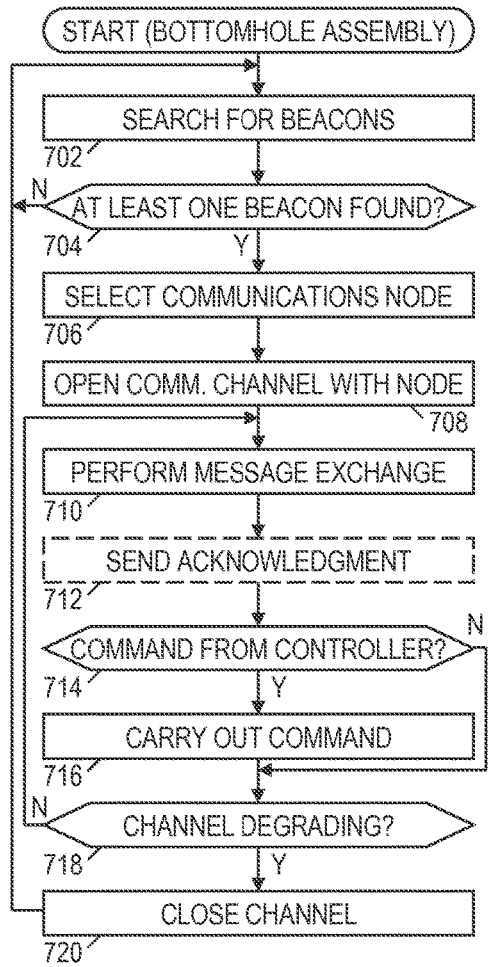
FIG. 7 shows an illustrative communication method that can be implemented by a bottomhole assembly.

FIG. 7 shows an illustrative communication method that can be implemented by a bottomhole assembly. Once the method is initiated, the telemetry module in bottomhole assembly begins searching for reference node beacons in block 702. Block 704 checks to determine if a beacon has been found, and if not, the telemetry module loops back to block 702. Once one or more beacons have been found, the telemetry module reaches block 706, where the telemetry module selects the source of the strongest beacon as a communications node. In block 708, the telemetry module initiates a handshaking operation with the selected reference node to open a bi-directional communications channel.

In block 710, the telemetry module performs a message exchange with the reference node. The message exchange includes transmitting message packets with any data that the bottomhole assembly is configured to acquire and transmit to the surface facility. Such data can include information regarding the position and velocity of the bottomhole assembly, formation properties that have been logged, and performance characteristics of the bottomhole assembly.

The message exchange further includes receiving any commands that might have been sent by the surface facility. If any such commands are received, the receipt of such commands is optionally acknowledged in block 712. In some embodiments, the acknowledgement is sent via the electromagnetic communication link to the reference node, while in other embodiments, the acknowledgement is communicated via the drill string.

In block 714, the telemetry module checks the receive queue to determine if any of the received messages include a command from the surface facility. If so, the telemetry module carries out the command in block 716. Such commands can include commands to change the configuration or operating parameters of the bottomhole assembly. Other illustrative commands are commands to have selected data or parameter values transmitted to the surface facility.

In block 718, the telemetry module checks the quality of the electromagnetic communications link. If the channel is degrading (e.g., the signal-to-noise ratio is below a given threshold, or too many symbol errors are detected), the telemetry module closes the channel and loops back to block 702. Otherwise the telemetry module loops back to block 710 to perform another message exchange.

Figure 8:
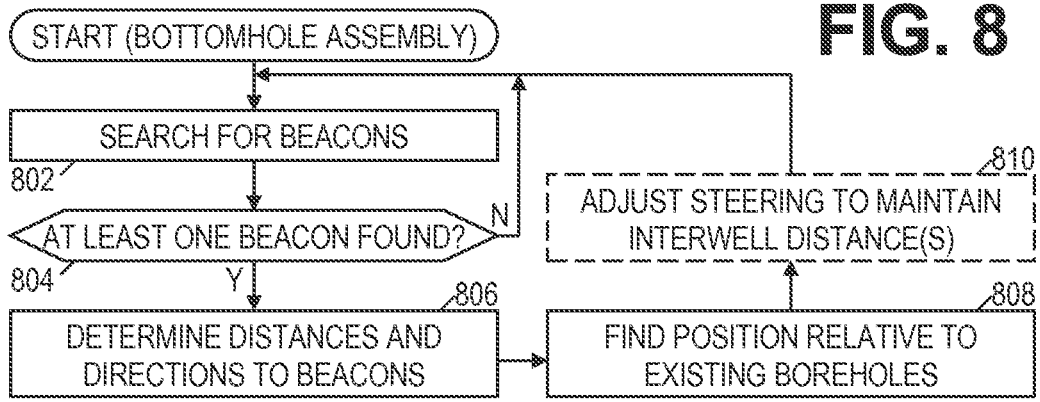
FIG. 8 shows an illustrative guidance method that can be implemented by a bottomhole assembly.

FIG. 8 shows an illustrative guidance method that can be implemented by a bottomhole assembly. This guidance method runs concurrently with the communication method described above, and may be implemented within the telemetry module or separately in the sensor module of the bottomhole assembly. In block 802, the bottomhole assembly searches for reference node beacons. In block 804, a check is made to determine whether at least one beacon has been found, and if not, the method loops back to block 802.

Once at least one beacon has been detected, the bottomhole assembly determines the distances and directions to each of the detectable beacons in block 806. Suitable methods for determining distance and direction are disclosed by Arthur Kuckes in U.S. Pat. Nos. 5,305,212; RE36,569; 5,823,170; and 5,589,775. The methods taught by Kuckes are described in terms of a single reference node, but they are adaptable for use with multiple reference nodes by providing each reference node (or other magnetic field generator) with a distinctive signature that enables individual measurement of each magnetic field. As one example, the reference nodes can be enabled only one at a time and cycled in a predetermined sequence. In an alternative embodiment, each of the reference nodes reverses its magnetic field periodically with a frequency that is different from any other reference node. As yet another possible embodiment, the magnetic field generated by each reference node is modulated with a code that is orthogonal to the codes used by other nodes.

Whichever technique is chosen for making the magnetic fields distinctive allows the bottomhole assemblies to determine and monitor the gradient of the magnetic field. Given the change in gradient as a function of bottomhole assembly position, the distance and direction to the source of the magnetic field can be estimated. However, other methods for distance and direction determination can alternatively be employed, including monitoring of a rotating magnetic field, monitoring travel times, and/or triangulating relative to multiple magnetic field sources.

In block 808, the bottomhole assembly determines its position relative to the reference boreholes based at least in part on the distances and directions to the reference nodes. The bottomhole assembly can also employ displacement measurements and knowledge of the reference borehole geometry and positions of the reference nodes within the reference well. This information can be transmitted to the surface facility or, in optional block 810, the information can be provided to the steering module for use in keeping the bottomhole assembly on its programmed track. The method repeats as the bottomhole assembly moves, enabling the bottomhole assembly to track its position.

Figure 9:
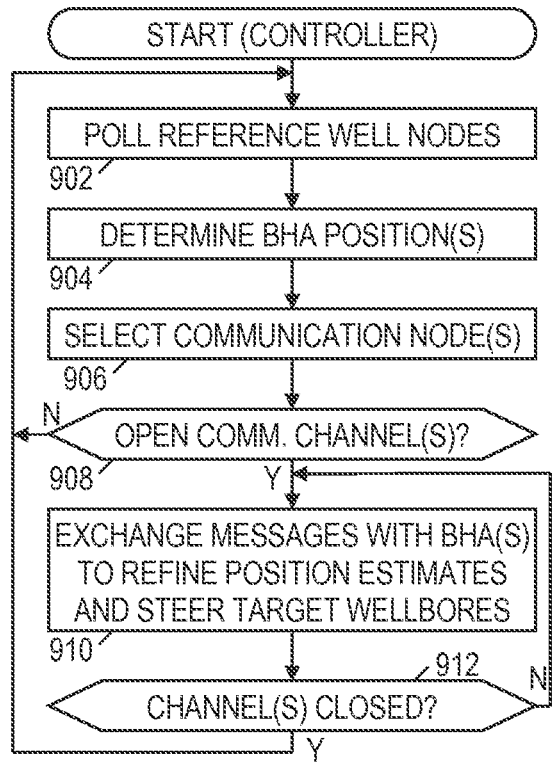
FIG. 9 shows an illustrative communication and guidance method that can be implemented by a surface facility.

FIG. 9 shows an illustrative communication and guidance method that can be implemented by a surface-based controller of the downhole activity. Beginning in block 902, the controller polls each of the reference nodes in the one or more borehole arrays, obtaining signal level measurements and any messages directed to the surface facility. Based on the gathered information, along with any other available information (such as length of the drill pipe in the hole), the controller determines the position of each bottomhole assembly in block 904. These positions can be expressed in absolute terms, but in at least some embodiments, these positions are expressed relative to one or more of the reference wells.

In block 906 the controller selects, for each bottomhole assembly, a reference node to serve as a communications intermediary with that bottomhole assembly. If the bottomhole assembly is not currently in a coverage zone, the selected reference node will be the next reference node that will come within range of the bottomhole assembly. On the other hand, if the bottomhole assembly is currently in a coverage zone, the selected reference node will usually be the node having the strongest signal or otherwise offering the highest channel capacity. In selecting a reference node, the controller may take into account potential interference from other bottomhole assemblies and previous performances of the candidate nodes.

Note that in some embodiments, the bottomhole assemblies select the reference nodes to be used as communications intermediaries. In such embodiments, the controller adopt those selections by detecting which reference nodes have open channels. Alternatively, the controller can disable unselected reference nodes and/or command the bottomhole assembly to switch between reference nodes.

In block 908, the controller checks for open communications channels. If none have yet been opened, the controller loops back to block 902. Otherwise, in block 910, the controller exchanges messages with the bottomhole assemblies to gather data and monitor their positions and progress. In some embodiments, the controller sends commands to the bottomhole assemblies to steer them along desired paths. In other embodiments, each bottomhole assembly steers itself along a programmed path, and the controller only intervenes to change the programmed path if something unexpected occurs.

In block 912, the controller determines whether a channel has been closed or there is some other reason for changing a selected reference node. If not, the controller loops back to block 910. Otherwise the controller loops back to block 902.

Numerous variations and modifications will be apparent to those of ordinary skill in the art once the above disclosure is fully appreciated. It is intended that the following claims be interpreted to embrace all such variations and modifications. As one example, rather than having the bottomhole assembly measure magnetic fields generated by reference nodes, alternative embodiments have the reference nodes measuring magnetic fields generated by the bottomhole assemblies. The reference nodes can individually or cooperatively determine the relative position of each bottomhole assembly and communicate it or other steering information to the bottomhole assembly via the electromagnetic communications link.

What is claimed is:

1. A method that comprises:
    emitting electromagnetic beacons by at least some of a plurality of electromagnetic reference nodes distributed along one or more reference wells and wired to a surface controller;
    storing, by said at least some of the plurality of electromagnetic reference nodes, position information comprising at least one type of data consisting of distance and direction of a bottomhole assembly in another well wherein each of the plurality of electromagnetic reference nodes includes a data queue responsive to being polled, and wherein the bottomhole assembly is configured to determine the position information relative to an emitted beacon from one of the plurality of reference nodes, to open a communication channel with said one of the plurality of reference nodes, and to provide the position information to a corresponding data queue;
    polling said at least some of the plurality of electromagnetic reference nodes distributed along the one or more reference wells;
    conveying the position information stored by said at least some of the plurality of electromagnetic reference nodes to the surface controller in response to said polling; and
    steering the bottomhole assembly in the other well based at least in part on triangulating a position of the bottomhole assembly relative to two or more of the plurality of electromagnetic reference nodes using respective emitted beacons from the two or more of the plurality of electromagnetic reference nodes and the position information obtained from said polling.

2. The method of claim 1, further comprising selecting said one of the plurality of reference nodes to be a communications intermediary between the surface controller and the bottomhole assembly.

3. The method of claim 2, wherein said selecting comprises identifying said one of the plurality of reference nodes as closest to the bottomhole assembly.

4. The method of claim 2, wherein said selecting comprises detecting which of the plurality of reference nodes has an open communication channel with the bottomhole assembly.

5. The method of claim 2, wherein said selecting accounts for any channel conflicts and any interference from at least one other bottomhole assembly within range of said one of the plurality of reference nodes.

6. The method of claim 2, further comprising performing a handshaking operation between the selected reference node of said one of the plurality of reference nodes and the bottomhole assembly.

7. The method of claim 1, further comprising:
    detecting, by the bottomhole assembly, a beacon corresponding to said one of the plurality of reference nodes;
    opening a communication channel between the bottomhole assembly and said one of the plurality of reference nodes associated with the beacon; and
    performing a message exchange between the bottomhole assembly and said one of the plurality of reference nodes via the opened communication channel.

8. The method of claim 1, further comprising:
    detecting, by the bottomhole assembly, a beacon corresponding to said one of the plurality of reference nodes;
    determining, by the bottomhole assembly, the distance and direction to the beacon; and performing, by the bottomhole assembly, at least one action selected from the group consisting of providing the position information related to the determined distance and direction to said one of the plurality of reference nodes, and using the position information to direct a steering module.

9. The method of claim 1, further comprising switching said one of the plurality of reference nodes between a beacon enabled configuration and a beacon disabled configuration.

10. The method of claim 1, further comprising:
    storing, by said one of the plurality of reference nodes, a message from the bottomhole assembly; and
    conveying the message in response to said polling, wherein the message includes information regarding at least one of a bottomhole assembly velocity, bottomhole assembly performance characteristics, and logged formation properties.

11. The method of claim 1, further comprising modulating timing or frequency attributes of beacons emitted by the plurality of reference nodes to enable said each reference node of the plurality of reference nodes to be associated with a distinct beacon.

12. A system that comprises:
    a plurality of electromagnetic reference nodes distributed along one or more reference wells, wherein at least some of the plurality of electromagnetic reference nodes emit a beacon;
    a bottomhole assembly in another well, wherein each of the plurality of electromagnetic reference nodes includes a data queue responsive to being polled, and wherein the bottomhole assembly is configured to determine position information relative to aft the emitted beacon from said at least some of the plurality of electromagnetic reference nodes, to open a communication channel with one of the plurality of reference nodes, and to provide the position information to a corresponding data queue; and a surface controller wired to the plurality of electromagnetic reference nodes, wherein the surface controller polls the plurality of electromagnetic reference nodes to obtain the position information regarding the bottomhole assembly from respective data queues and directs a steering module of the bottomhole assembly based on triangulating a position of the bottomhole assembly relative to two or more of the plurality of electromagnetic reference nodes using respective beacons of the two or more of the plurality of electromagnetic reference nodes and the obtained position information.

13. The system of claim 12, wherein the surface controller selects said one of the plurality of reference nodes to be a communications intermediary between the surface controller and the bottomhole assembly.

14. The system of claim 13, wherein the surface controller selects a reference node identified as closest to the bottomhole assembly as the communications intermediary.

15. The system of claim 13, wherein the surface controller selects a reference node identified as having an open communication channel with the bottomhole assembly as the communications intermediary.

16. The system of claim 13, wherein the surface controller directs said one of the plurality of reference nodes to switch between a beacon enabled configuration and a beacon disabled configuration.

17. The system of claim 12, wherein said each of the plurality of reference nodes includes a data queue responsive to being polled, wherein the bottomhole assembly is configured to open a communication channel with said one of the plurality of reference nodes and to provide a message to a corresponding data queue, wherein the message includes at least one of a bottomhole assembly velocity, logged formation properties, and bottomhole assembly performance characteristics.

18. The system of claim 12, wherein the plurality of reference nodes couple to the surface controller via a wireline cable or wired pipe.

* * * * *